United States Patent [19]

Jenkins

[11] 4,393,107

[45] Jul. 12, 1983

[54] COMPOSITE LABEL WEB

[75] Inventor: William A. Jenkins, Dayton, Ohio

[73] Assignee: Monarch Marking Systems, Inc., Dayton, Ohio

[21] Appl. No.: 239,817

[22] Filed: Mar. 2, 1981

[51] Int. Cl.[3] .......................... B32B 3/10; B32B 3/16

[52] U.S. Cl. .......................... 428/42; 428/40; 428/41; 428/43; 428/56; 40/2 R; 283/81; 428/136; 428/137; 428/906

[58] Field of Search .......................... 428/40–42, 428/55, 56, 136, 43, 137, 906; 40/2 R; 283/21

[56] References Cited

U.S. PATENT DOCUMENTS 4,173,293 11/1979 Hamisch et al. .......................... 221/1

4,309,468 1/1982 Aubin .......................... 428/42

4,320,158 3/1982 Seeley .......................... 428/136

*Primary Examiner*—Alexander S. Thomas

*Attorney, Agent, or Firm*—Joseph J. Grass

[57] ABSTRACT

There is disclosed a composite label web including a carrier web and labels releasably adhered by pressure sensitive adhesive to the carrier web, with the carrier web having improved feed cuts. The composite label web is wound into a roll. The cuts are arranged in groups. Certain groups have two lateral cuts and a longitudinal cut. The lateral cuts extend away from the outer free end of the composite label web toward respective leading and trailing locations on the longitudinal cut. These groups of cuts are in pre-determined relation with respect to chevron-shaped feed cuts in the carrier web.

26 Claims, 6 Drawing Figures

FIG-1
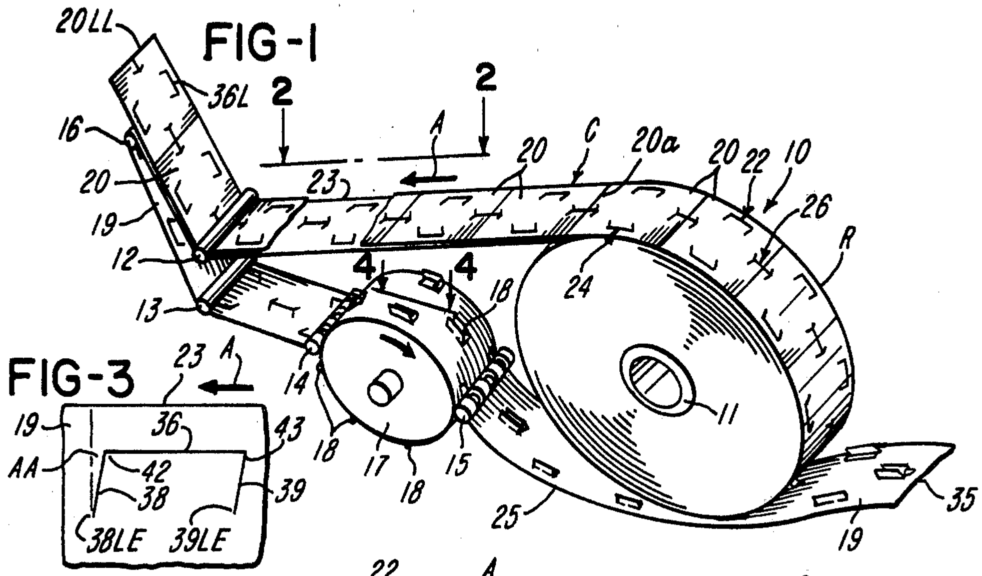
FIG-3
FIG-2
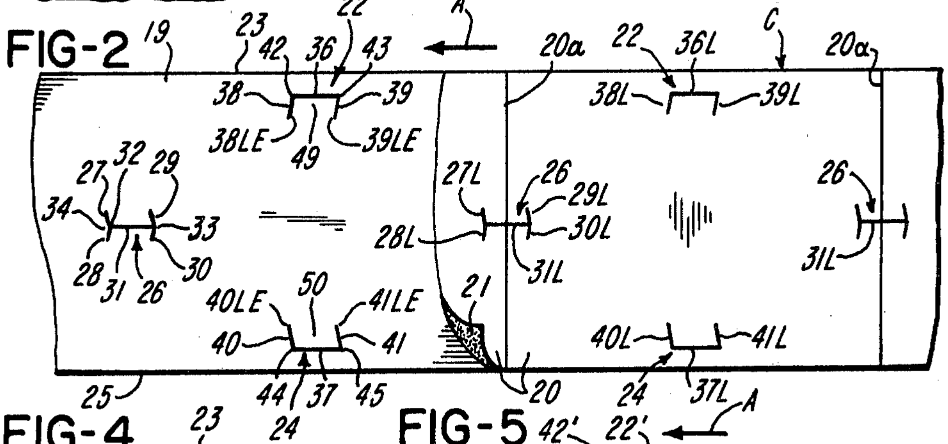
FIG-4
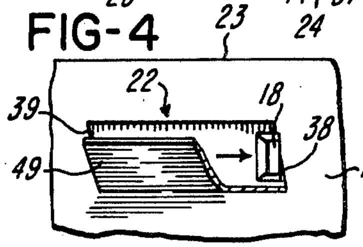
FIG-6
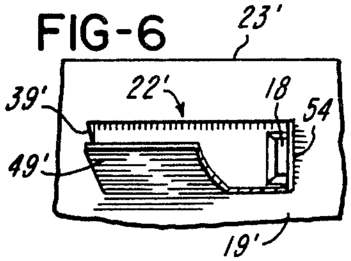
FIG-5
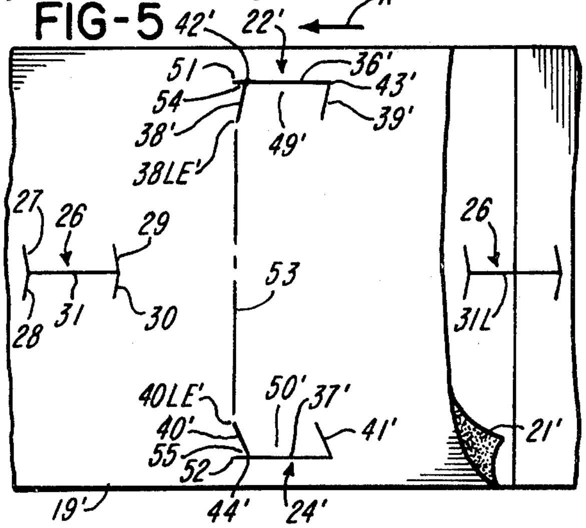

COMPOSITE LABEL WEB

BACKGROUND OF THE INVENTION

1. Field of the Invention

This invention relates to the art of composite label webs.

2. Brief Description of the Prior Art

Prior art U.S. patents to W. A. Jenkins U.S. Pat. No. 3,783,083 granted Jan. 1, 1974 and to G. A. Neubauer U.S. Pat. No. 4,094,438 granted June 13, 1978 disclose various embodiments of composite label webs with cuts in the carrier web to facilitate label feeding. U.S. patent application of W. J. Seeley Ser. No. 154,679, filed May 30, 1980, now U.S. Pat. No. 4,320,158 discloses a further embodiment of a composite label web with cuts in the carrier web to facilitate label feeding. U.S. patent to P. H. Hamisch, Jr. U.S. Pat. No. 4,173,293 granted Nov. 6, 1979 discloses a composite label web with staggered feed cuts.

SUMMARY OF THE INVENTION

The purpose of the invention is to provide improved feed cuts in a carrier web of a composite label web. The composite level web of the invention is especially useful for use in a hand-held labeler where accurate registration and the absence of tearing of the carrier web are important. The feed cuts are arranged in groups. Certain groups are preferably narrow in the longitudinal direction of the carrier web. The use of narrow feed cuts is important in applications where it is desired to keep the feed cuts out of the area which is to receive printing. For example, in printing labels with the OCR-A code, certain areas are to be kept clear of printing and other machine detectable marks or cuts. The cuts are so configured so that a group of cuts can be close to a side of the carrier web, and the cuts are inclined in such a direction as to minimize the tendency of the carrier web to tear between the group of cuts and the adjacent side edge of the carrier web. By keeping the groups of cuts narrow, there is minimal weakening of the carrier web in the lengthwise direction. According to one specific embodiment of the invention, there is provided a composite label web having a longitudinally extending carrier web with a series of labels releasably adhered by a coating of pressure sensitive adhesive to the carrier web. The composite label web is wound into a roll. There are longitudinally spaced groups of cuts in the carrier web, the groups including a longitudinal cut and a pair of lateral cuts extending from the outer free end of the composite label web to respective leading and trailing locations on the longitudinal cut. The lateral cut of each group which is closer to the outer free end joins the leading edge of the longitudinal cut. This results in the leading lateral cut passing about the delaminator progressively. Moreover, the inclination of the leading lateral cut is from the leading end of the lateral cut away from the adjacent side edge of the carrier web. One lateral cut makes an obtuse angle with respect to the longitudinal cut and the other lateral cut makes an acute angle with respect to the longitudinal cut. According to another illustrated embodiment, the leading lateral cut joins the longitudinal cut slightly upstream or rearwardly of the leading end of the longitudinal cut. These cuts result in a flap or flap portion which extends in a trailing direction, that is, away from the outer free end of the composite web. The leading terminal ends of the longitudinal cut and leading lateral cut are disposed along a line perpendicular to the longitudinal extent of the carrier web.

BRIEF DESCRIPTION OF THE DRAWINGS

FIG. 1 is a diagrammatic perspective view of an improved composite label web having a carrier web threaded through a label applying apparatus;

FIG. 2 is a top plan view of the composite label web along line 2—2 of FIG. 1 with a portion of the label material removed for the sake of clarity;

FIG. 3 is a top plan view of a portion of the carrier web of one embodiment;

FIG. 4 is a top plan view of a fragmentary portion of the carrier web taken along line 4—4 in FIG. 1;

FIG. 5 is an enlarged top plan view similar to FIG. 2, but showing an alternative form of feed cut; and FIG. 6 is a top plan view similar to FIG. 4 of a fragmentary portion of a carrier web of the embodiment of FIG. 5.

DETAILED DESCRIPTION OF THE PREFERRED EMBODIMENTS

With reference to FIG. 1, there is shown a diagrammatic view of a label dispensing apparatus 10 which includes a support 11 for rotatably mounting a roll R of a composite label web C, a series of guide rolls 12, 13, 14 and 15, a delaminator 16 and a toothed driver 17 having a series of staggered teeth 18. The delaminator 16 can take the form of a small diameter peel roller as shown or of a peel edge. The composite label web C includes a carrier web 19 on which labels 20 are releasably adhered by pressure sensitive adhesive 21 (FIG. 2). The labels 20 are formed by butt cuts 20*a*. The composite label web C is drawn off the outer periphery of the roll R upon rotation of the driver 17. As the composite label web C is drawn off the roll R, the composite web C passes first in the direction of arrow A (FIGS. 1 and 2) and then about roller 12. At the delaminator 16, the leading label 20LL is peeled off the carrier web 19 progressively as the carrier web 19 progresses about the delaminator 16. From there the carrier web 19 passes about rollers 13 and 14, about the toothed driver 17, and about roller 15.

The composite label web C is best shown in FIG. 2 to have groups 22 of cuts closely adjacent side edge 23 of the carrier web 19, groups 24 of cuts closely adjacent side edge 25 of the carrier web 19, and groups 26 of cuts disposed medially of side edges 23 and 25. The groups 22 and 24 are shown to be in lateral alignment and the groups 26 are shown to be staggered with respect to the groups 22 and 24. The groups 22 and 24 are narrower than the groups 26.

The groups 26 are disclosed in above-mentioned U.S. application Ser. No. 154,679, but briefly each group 26 includes lateral knife cuts 27 and 28, a pair of lateral knife cuts 29 and 30, and a longitudinal cut 31. The cuts 27 and 28 make obtuse angles with respect to the longitudinal cut 31 and the cuts 29 and 30 make acute angles with respect to the cut 31. The cuts 27 and 28 converge toward a point of convergence 32 and cuts 29 and 30 converge toward a point of convergence 33. The longitudinal cut 31 is joined to the points 32 and 33. The cuts 27 and 28 define a flap or flap portion 34 which extends in the trailing direction, that is, a direction opposite to the direction of arrow A, so that the flaps 34 of the groups 26 extend in the trailing direction as they pass about delaminator 16. The flap portions 34 accordingly extend away from the outer free end 35 of the carrier web 19. Groups 26 have cuts 27L, 28L, 29L, 30L and 31L in the labels 20 which are aligned with respective cuts 27, 28, 29, 30 and 31 in the carrier web 19.

The groups 22 and 24 have respective longitudinal cuts 36 and 37 and respective pairs of lateral cuts 38 and 39, and 40 and 41. There are corresponding cuts 36L, 38L and 39L in the label 20 of each group 22 and there are corresponding cuts 37L, 40L and 41L of each group 24 in the label 20. Pairs of cuts 36 and 36L, 37 and 37L, 38 and 38L, 39 and 39L, 40 and 40L, and 41 and 42L are made simultaneously by a cutter which preferably cuts all the way through the label web C.

The cuts 38 and 39 of groups 22 are inclined away from the outer free end 35 of the carrier web 19 and converge toward the longitudinal cut 36 at respective spaced locations or points of convergence 42 and 43. The cuts 40 and 41 of groups 24 are inclined away from the outer free end 35 of the carrier web 19 and converge toward the longitudinal cut 37 at respective spaced locations or points of convergence 44 and 45. The cut 38 has a leading end 38LE which is at a leading location with respect to the other end of the cut 38 which terminates at the point of convergence 42. The cut 39 has a leading end 39LE which is at a leading location with respect to the other end of the cut 39 which terminates at the point of convergence 43. Leading and trailing ends of the cut 36 terminate at the respective points of convergence 42 and 43. Similarly, each lateral cut 40 has a leading end 40LE and a trailing end that terminates at the point of convergence 44 and each lateral cut 41 has a leading end 41LE and a trailing end which terminates at the point of convergence 45. The longitudinal cut 37 terminates at its leading end at the point of convergence 44 and at its trailing end at the point of convergence 45. As shown, the cuts which comprise the groups 22 and 24 provide a relatively narrow cut configuration disposed close to the respective side edges 23 and 35 of the carrier web 19. The inclination of the cuts 38 and 39 and 40 and 41 minimizes the tendency of the carrier web 19 to tear out between the group 22 and side edge 23 and between the group 24 and side edge 25 respectively during advance of the carrier web 19 about the delaminator 16 or about the toothed driver 17. The lateral cuts 38 and 39 lead away from the associated longitudinal cut 36 and the lateral cuts 40 and 41 lead away from the associated longitudinal cut 37. The lateral cuts 38 and 39 are disposed at the side of the longitudinal cut 36 which is away from the adjacent side edge 23 and the lateral cuts 40 and 41 are disposed at the side of the longitudinal cut 37 away from the adjacent side edge 35. The groups 22 and 24 are narrow so that they fall within a free area of the label 20. Free areas are designated according to standards set for the printing of certain codes such as the code OCR-A.

FIG. 4 shows a tooth 18 of a driver 17 acting on edge of the cut 38 of the group 22. The advancing tooth 18 tends to deflect the edge 38 somewhat, as shown. FIG. 4 shows a flap or flap portion 49 defined by cuts 36, 38 and 39 folded out of the plane of the remainder of the carrier web 19 by tooth 18. The cuts 37, 40 and 41 define the flap 50. The cuts 38 and 39 are shown to be parallel and of equal length, and the cuts 40 and 41 are shown to be parallel and of equal length. The cuts 38, 39, 40 and 41 are inclined with respect to the perpendicular at an angle AA of about 10 degrees but are not limited to this angle. It is preferred that the angle AA be less than 20 degrees. Similarly the cuts 27, 28, 29 and 30 are inclined at the same angle as the cuts 28, 39, 40 and 41, namely, about 10 degrees.

With respect to the embodiment of FIGS. 5 and 6, the groups 22 and 24 are shown to be modified as indicated at 22′ and 24′ by having respective longitudinal cuts 36′ and 37′ extending beyond respective points of convergence 42′ and 44′, as shown. Leading ends 51 and 52 of respective longitudinal cuts 36′ and 37′ and leading ends 38LE′ and 40LE′ of lateral cuts 38′ and 40′ terminate along a lateral line 53 which extends perpendicularly to the longitudinal extent of the composite label web C′. Accordingly, the leading end portions of the cuts 36′, and 37′, which extend forwardly beyond respective points of convergence 42′ and 44′ and the respective lateral cuts 38′ and 40′ define respective trailing flaps 54 and 55. Flaps 54 and 55 extend in the trailing direction opposite the direction of arrow A and away from the outer free end 35 of the carrier web 19′. As such, there is no tendency of the flaps 54 and 55 to extend out of the plane of the carrier web 19 as the carrier web passes about the delaminator 16. In other respects, groups 22′ and 24′ are identical in construction and location as the groups 22 and 24. With reference to fragmentary view in FIG. 6, a group 22′ is shown closely adjacent side edge 23′ of the carrier web 19′. FIG. 6 shows a flap portion 54 deflected by the tooth 18. The tooth 18 also deflects flap or flap portion 49′ as shown. Cuts 37′, 40′ and 41′ are shown to define flap 50′.

Other embodiments and modifications of the invention will suggest themselves to those skilled in the art, and all such of these as come within the spirit of this invention are included within its scope as best defined by the appended claims.

I claim:

1. A composite label web for use in a label dispensing apparatus, the composite web comprising: a longitudinally extending carrier web, a series of labels releasably adhered by a coating of pressure sensitive adhesive to the carrier web, the composite web being wound into a roll and having an outer free end, longitudinally spaced groups of cuts in the carrier web, at least some groups of cuts including a single lateral cut at a leading location with respect to the outer free end of the composite web and a single lateral cut at a trailing location with respect to the outer free end of the carrier web, a generally longitudinal cut converging toward the respective end portions of the lateral cuts, the lateral cut of each group at the leading location and the respective longitudinal cut making an obtuse angle and the lateral cut of each group at the trailing location and the respective longitudinal cut making an acute angle, and wherein each lateral cut of said some groups is disposed on only one side of the respective longitudinal cut.

2. A composite label web for use in a label dispensing apparatus, the composite web comprising: a longitudinally extending carrier web, a series of labels rreleasably adhered by a coating of pressure sensitive adhesive to the carrier web, the composite web being wound into a roll and having an outer free end, longitudinally spaced groups of cuts in the carrier web, at least some groups of cuts including two and only two lateral cuts, one lateral cut being at a leading location with respect to the outer free end of the composite web and the other lateral cut being at a trailing location with respect to the outer free end of the web, a generally longitudinal cut converging toward the respective end portions of the lateral cuts, the lateral cut of each said group at the leading location and the respective longitudinal cut making an obtuse angle, the lateral cut of each said group at the trailing location and the respective longitudinal cut making an acute angle, and wherein each lateral cut is disposed at one side of the respective longitudinal cut.

3. A composite label web for use in a label dispensing apparatus, the composite web comprising: a longitudinally extending carrier web, a series of labels releasably adhered by a coating of pressure sensitive adhesive to the carrier web, the composite web being wound into a roll and having an outer free end, longitudinally spaced groups of cuts in the carrier web, at least some groups of cuts including a single lateral cut at a leading location with respect to the outer free end of the composite web and a single lateral cut at a trailing location with respect to the outer free end of the composite web, a generally longitudinal cut converging toward the respective end portions of the lateral cuts, the lateral cut of each said group at the leading location and the respective longitudinal cut making an obtuse angle, wherein the longitudinal cut of each said group and the lateral cut at the leading location converge toward a point of convergence, wherein the longitudinal cut extends toward the outer free end of the composite web beyond the point of convergence, the lateral cut of each said group at the trailing location and the respective longitudinal cut making an acute angle, and wherein each lateral cut is disposed at one side of the respective longitudinal cut.

4. A composite label web for use in a label dispensing apparatus, the composite label web comprising: a longitudinally extending carrier web, a series of labels releasably adhered by a coating of pressure sensitive adhesive to the carrier web, the composite web being wound into a roll and having an outer free end, longitudinally spaced groups of cuts in the carrier web, at least some groups of cuts including a generally longitudinally extending cut and a single lateral cut converging from the outer free end of the composite web toward the longitudinal cut at a leading location with respect to the outer free end of the composite web, and wherein each lateral cut of said some groups is disposed on only one side of the respective longitudinal cut.

5. A composite label web as defined in claim 4, wherein the leading end of the lateral cut and the leading end of the longitudinal cut are joined.

6. A composite label web as defined in claim 5, wherein the leading end of the longitudinal cut is spaced from the trailing end of the lateral cut.

7. A composite label web as defined in claim 5, wherein the leading end of the lateral cut at the leading location and the leading end of the longitudinal cut are disposed along a line perpendicular to the longitudinal direction along the carrier web.

8. A composite label web as defined in any one of claims 1 through 7 wherein the groups of cuts are located adjacent both side edges of the carrier web, and all the lateral cuts of each group are disposed on the side of the respective longitudinal cut away from the adjacent side edge of the carrier web.

9. A composite label web for use in a label dispensing apparatus, the composite label web comprising: a longitudinally extending carrier web, a series of labels releasably adhered by a coating of pressure sensitive adhesive to the carrier web, the composite web being wound into a roll and having an outer free end, longitudinally spaced groups of cuts in the carrier web, said groups including a generally longitudinally extending cut and at least one lateral cut, the longitudinal cut having a leading location with respect to the outer free end of the carrier web, a lateral cut converging from the outer free end of the composite web toward the leading location of the longitudinal cut of the respective group, all the lateral cuts of each said group being disposed on the side of the respective longitudinal cut away from one side edge of the composite web.

10. A composite label web as defined in claim 9, wherein each longitudinal cut has a trailing location with respect to the outer free end of the composite web, and each said group of cuts includes a lateral cut converging from the outer free end of the composite web toward the trailing location.

11. A composite label web as defined in claim 9, wherein the lateral cuts of each said group are parallel.

12. A composite label web as defined in claim 9, wherein the point of convergence of the lateral cut and the longitudinal cut is spaced from the leading end of the longitudinal cut.

13. A composite web as defined in claim 12, wherein the lateral cut and the longitudinal cut are joined at the point of convergence.

14. A composite label web for use in a label dispensing apparatus, the composite web comprising: a longitudinally extending carrier web, a series of labels releasably adhered by a coating of pressure sensitive adhesive to the carrier web, the composite web being wound into a roll and having an outer free end, longitudinally spaced groups of cuts adjacent each side edge of the carrier said groups including a generally longitudinally extending cut and at least one lateral cut, the longitudinal cut having a leading location with respect to the outer free end of the composite web, a said lateral cut converging from the outer free end of the composite web toward the leading location of the longitudinal cut of the respective group, and all of the lateral cuts of each said group being disposed on the side of the respective longitudinal cut away from the respective adjacent side edge of the carrier web.

15. A composite web as defined in claim 14, wherein each longitudinal cut has a trailing location with respect to the outer free end of the composite web, and each group of cuts includes a lateral cut converging from the outer free end of the composite web toward the trailing location.

16. A composite label web as defined in either claim 14 or claim 15, including second groups of longitudinally spaced cuts disposed generally centrally in the carrier web, the cuts of each centrally disposed second group of cuts includes a first pair of lateral cuts converging toward a first point and away from the outer free end of the roll, a second pair of lateral cuts spaced longitudinally from the first pair of cuts and converging toward a second point away from the outer free end of the roll and a longitudinal cut extending between the first and second points, the first and second pairs of cuts and the longitudinal cut defining a flap projecting longitudinally in a trailing direction away from the outer free end of the carrier web and a pair of laterally disposed flaps, and wherein the lateral cuts of each second group adjacent a said side edge of the carrier web are parallel, straight and of equal length.

17. A composite label web as defined in either claim 14 or claim 15, including groups of longitudinally spaced cuts disposed generally centrally in the carrier web, the cuts of each centrally disposed group of cuts includes a first pair of lateral cuts converging toward a first point and away from the outer free end of the roll, a second pair of lateral cuts spaced longitudinally from the first pair of cuts and converging toward a second point away from the outer free end of the roll and a longitudinal cut extending between the first and second points, and the first and second pairs of cuts and the longitudinal cut defining a flap projecting longitudinally in a trailing direction away from the outer free end of the carrier web and a pair of laterally disposed flaps.

18. A composite label web as defined in claim 17, wherein the centrally disposed groups of cuts are staggered longitudinally with respect to the groups of cuts adjacent the side edges of the carrier web.

19. A composite label web as defined in claim 17, wherein all the cuts are straight.

20. A composite label web as defined in claim 17, wherein the groups of cuts which are adjacent the side edges are narrower than the groups which are centrally disposed.

21. A composite label web as defined in claim 17, wherein the lateral cuts are inclined at an angle of about 10 degrees relative to a line perpendicular to the longitudinal extent of the carrier web.

22. A composite label web as defined in claim 17, wherein all the lateral cuts are inclined at the same angle with respect to a line perpendicular to the longitudinal extent of the carrier web.

23. A composite label web for use in lateral dispensing apparatus, the composite label web comprising: a longitudinally extending carrier web, a series of labels releasably adhered by a coating of pressure sensitive adhesive to the carrier web, the composite web being wound into a roll and having an outer free end, longitudinally spaced groups of cuts in the carrier web, the groups being disposed closely adjacent one side edge of the carrier web, each group including a generally longitudinally extending cut and at least one lateral cut, the longitudinal cut having a leading location with respect to the outer free end of the composite web, a said lateral cut converging from the outer free end of the composite web toward the leading location of the longitudinal cut of the respective group, all the lateral cuts of each group being disposed on the side of the respective longitudinal cut away from the adjacent side edge of the carrier web, wherein each longitudinal cut has a trailing location with respect to the outer free end of the composite web, and each group of cuts includes a lateral cut converging from the outer free end of the composite web toward the trailing location of the respective longitudinal cut, wherein the lateral cuts of each group are parallel.

24. A composite label web for use in a label dispensing apparatus, the composite label web comprising: a longitudinally extending carrier web, a series of labels releasably adhered by a coating of pressure sensitive adhesive to the carrier web, the composite web being wound into a roll and having an outer free end, longitudinally spaced groups of cuts in the carrier web, the groups being disposed closely adjacent one side edge of the carrier web, each group including a generally longitudinally extending cut and at least one lateral cut, the longitudinal cut having a leading location with respect to the outer free end of the composite web, a said lateral cut converging from the outer free end of the composite web toward the leading location of the longitudinal cut of the respective group, all the lateral cuts of each group being disposed on the side of the respective longitudinal cut away from the adjacent side edge of the carrier web, wherein the point of convergence of the lateral cut and the longitudinal cut is spaced from the leading end of the longitudinal cut.

25. A composite label web for use in a label dispensing apparatus, the composite label web comprising: a longitudinally extending carrier web, a series of labels releasably adhered by a coating of pressure sensitive adhesive to the carrier web, the composite web being wound into a roll and having an outer free end, longitudinally spaced groups of cuts in the carrier web, the groups being disposed closely adjacent one side edge of the carrier web, each group including a generally longitudinally extending cut and at least one lateral cut, the longitudinal cut having a leading location with respect to the outer free end of the composite web, a said lateral cut converging from the outer free end of the composite web toward the leading location of the longitudinal cut of the respective group, all the lateral cuts of each group being disposed on the side of the respective longitudinal cut away from the adjacent side edge of the carrier web, wherein the point of convergence of the lateral cut and the longitudinal cut is spaced from the leading end of the longitudinal cut, and wherein the lateral cut and the longitudinal cut are joined at the point of convergence.

26. A composite label web for use in a label dispensing apparatus, the composite web comprising: a longitudinally extending carrier web, a series of labels releasably adhered by a coating of pressure sensitive adhesive to the carrier web, the composite web being wound into a roll and having an outer free end, longitudinally spaced groups of cuts adjacent each side edge of the carrier said groups including a generally longitudinally extending cut and at least one lateral cut, the longitudinal cut having a leading location with respect to the outer free end of the composite web, a said lateral cut converging from the outer free end of the composite web toward the leading location of the longitudinal cut of the respective group, all of the lateral cuts of each said group being disposed on the side of the respective longitudinal cut away from the respective adjacent side edge of the carrier web, and wherein the lateral cuts of each group adjacent a said side edge of the carrier web are parallel, straight and of equal length.

* * * * *

UNITED STATES PATENT AND TRADEMARK OFFICE

CERTIFICATE OF CORRECTION

PATENT NO. : 4,393,107

DATED : July 12, 1983

INVENTOR(S) : William A. Jenkins

It is certified that error appears in the above-identified patent and that said Letters Patent are hereby corrected as shown below:

Column 7, line 26, "lateral" should be --label--.

Signed and Sealed this

*Eighth* Day of *November 1983*

[SEAL]

*Attest:*

GERALD J. MOSSINGHOFF

*Attesting Officer* *Commissioner of Patents and Trademarks*